(12) United States Patent
Klapp et al.

(10) Patent No.: US 6,360,550 B2
(45) Date of Patent: Mar. 26, 2002

(54) AIR CONDITIONING SYSTEM AND METHOD OF CONTROLLING SAME

(75) Inventors: Andrew J. Klapp, Trenton; Shane A. Harte, Farmington; Thomas P. Gielda, Brighton; Yong Huang, Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/756,381

(22) Filed: Jan. 8, 2001

Related U.S. Application Data
(60) Provisional application No. 60/179,236, filed on Jan. 31, 2000.

(51) Int. Cl.[7] .............................................. F25D 17/06
(52) U.S. Cl. ........................... 62/94; 62/176.6; 62/271; 236/44 C
(58) Field of Search .............................. 62/203, 93, 94, 62/271, 244, 176.1, 176.3, 176.6; 236/44 R, 44 A, 44 C; 165/222, 223, 225, 227

(56) References Cited

U.S. PATENT DOCUMENTS

| 5,230,466 A | * | 7/1993 | Moriya et al. ............. 62/271 X |
| 5,697,223 A | * | 12/1997 | Ishii et al. ............. 62/176.1 X |
| 5,873,256 A | * | 2/1999 | Denniston .................. 62/244 X |
| 6,029,462 A | | 2/2000 | Denniston ...................... 62/94 |
| 6,205,805 B1 | * | 3/2001 | Takahashi et al. ......... 62/271 X |
| 6,247,323 B1 | * | 6/2001 | Maeda ....................... 62/94 X |

* cited by examiner

*Primary Examiner*—Harry B. Tanner
(74) *Attorney, Agent, or Firm*—Larry I. Shelton

(57) ABSTRACT

An air conditioning (A/C) system and method of controlling same is provided for a vehicle. The A/C system includes an evaporator, a desiccant dryer located downstream of the evaporator, and a compressor fluidly connected to the air evaporator. The A/C system also includes a plurality of sensors to provide inputs relating to temperature of the evaporator and relative humidity of an occupant compartment of the vehicle. The A/C system further includes an electronic control unit electrically connected to the sensors to receive the inputs therefrom and electrically connected to the desiccant dryer and the compressor to turn the desiccant dryer and the compressor On and Off to control the temperature and relative humidity of air to the occupant compartment.

20 Claims, 4 Drawing Sheets

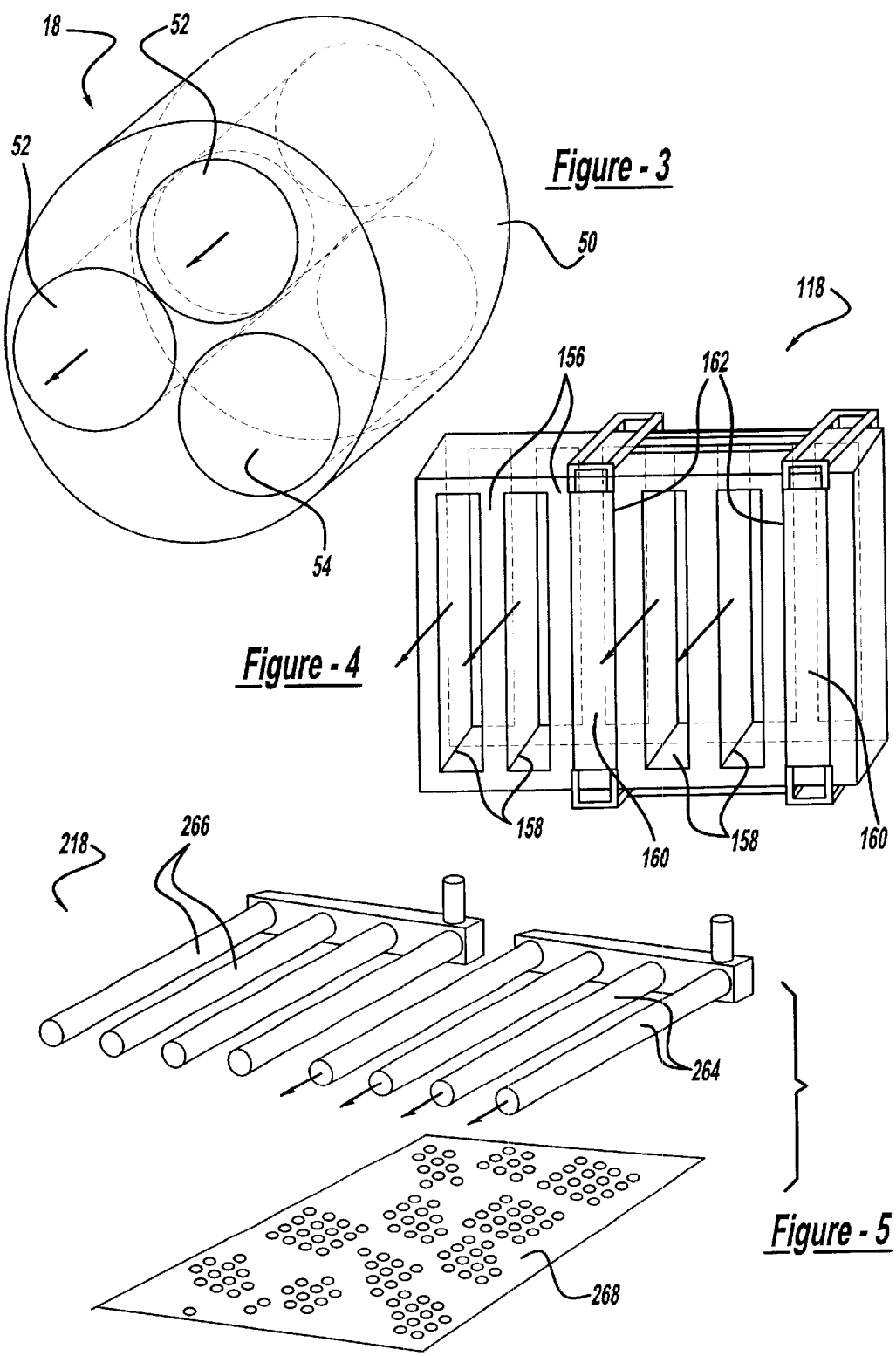

AIR CONDITIONING SYSTEM AND METHOD OF CONTROLLING SAME

CROSS-REFERENCE TO RELATED APPLICATION(S)

The present invention claims the priority date of copending U.S. Provisional Patent Application Serial No. 60/179,236, filed Jan. 31, 2000.

BACKGROUND OF THE INVENTION

1. Field of the Invention

The present invention relates generally to air conditioning systems and, more specifically, to an air conditioning (A/C) system and method of controlling the A/C system.

2. Description of the Related Art

It is known to provide an air conditioning (A/C) system for a vehicle. Typically, the A/C system is used to control cooling in an interior, cabin, or occupant compartment of the vehicle. The A/C system generally includes a condenser, compressor, evaporator, and expansion valve to remove heat from air and cool the air to the occupant compartment. The A/C system may include a desiccant dryer to remove moisture from the air.

It is also known to provide a mechanism to regenerate desiccant materials in the desiccant dryer by heating them and boiling off water vapor. An example of desiccant air conditioning for a motorized vehicle is disclosed in U.S. Pat. No. 6,029,462 to Denniston. In this patent, a complicated array of desiccant wheels and enthalpic wheels are required to regenerate the desiccant materials. However, this is difficult to achieve from a packaging standpoint in a motor vehicle. Also, in these systems, the only heat source sufficient to burn off the water vapor is engine exhaust, which is undesired.

An alternative to heating the desiccant materials of the desiccant dryer is to use vacuum to boil off the water vapor. A motor vehicle has vacuum available for most operating conditions. However, in a vacuum strategy, an important factor is the regeneration frequency. In order to boil off the water vapor, it is necessary to cycle rapidly between adsorption and desorption stages. This is necessary because desorption is an endothermic process. In a near vacuum, there is no mechanism to provide the heat required.

As a result, it is necessary to cycle the system according to the equation:

$$f = \frac{m_{H2O} * \Delta h_{vaporisaton}}{m_{desiccant} * Cp_{dessicant} * (T_{evap} - 32)}$$

Otherwise, the water present in the desiccant dryer will ice up and prevent further desorption. Therefore, there is a need in the art to provide an air conditioning system and method of controlling the air conditioning system to cycle the desiccant dryer.

SUMMARY OF THE INVENTION

Accordingly, the present invention is an air conditioning (A/C) system for a vehicle. The A/C system includes an evaporator, a desiccant dryer located downstream of the evaporator, and a compressor fluidly connected to the evaporator. The A/C system also includes a plurality of sensors to provide inputs relating to temperature of the evaporator and relative humidity of an occupant compartment of the vehicle. The A/C system further includes an electronic control unit electrically connected to the sensors to receive the inputs therefrom and electrically connected to the desiccant dryer and the compressor to turn the desiccant dryer and the compressor On and Off to control the temperature and relative humidity of air to the occupant compartment.

One advantage of the present invention is that an A/C system having a desiccant dryer is provided t o control relative humidity of air in an occupant compartment of a vehicle. Another advantage of the present invention is that the A/C system also includes a variable displacement compressor Yet another advantage of the present invention is that a method is provided for regeneration of a desiccant dryer of the A/C system. Still another advantage of the present invention is that the A/C system receives inputs from a plurality of sensors such as a humidity sensor, sunload sensor, temperature sensors, etc. and provides outputs to cycle the desiccant dryer On and Off to regenerate the desiccant materials.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a perspective view of a desiccant dryer, according to the present invention, for the A/C system of FIG. 1.

FIG. 4 is a perspective view of another embodiment, according to the present invention, of a desiccant dryer for the A/C system of FIG. 1.

FIG. 5 is a perspective view of yet another embodiment, according to the present invention, of a desiccant dryer for the A/C system of FIG. 1.

DESCRIPTION OF THE PREFERRED EMBODIMENT(S)

Figure 1:
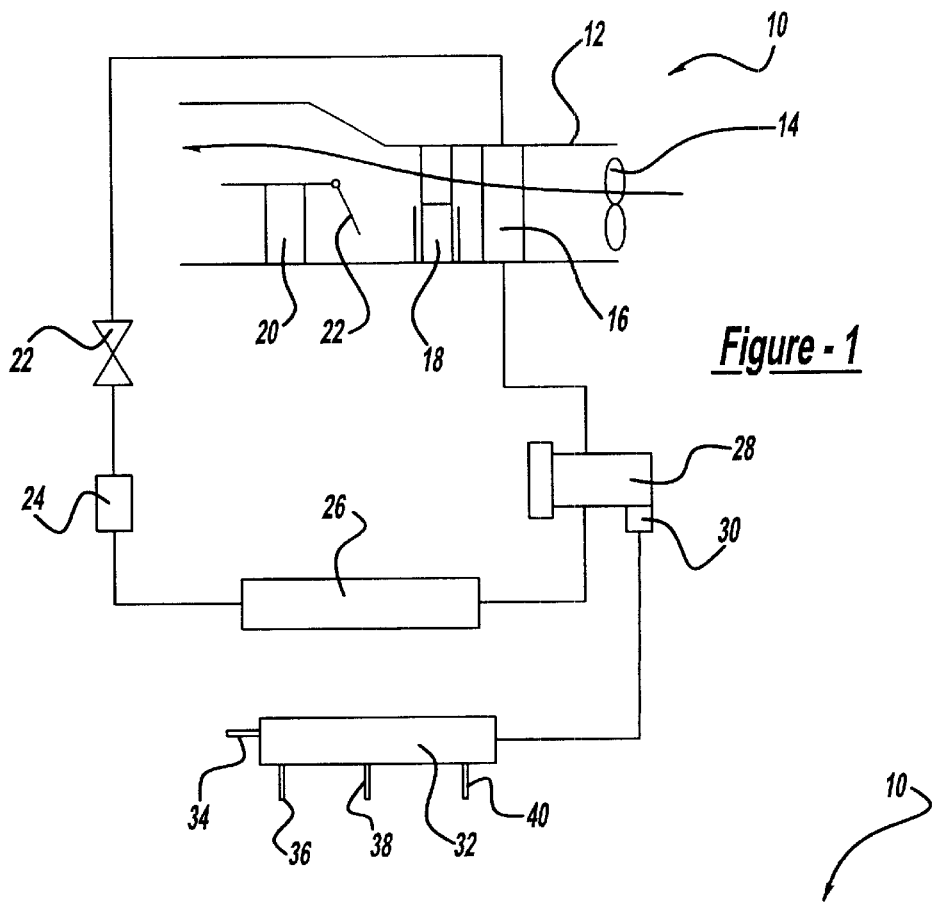
FIG. 1 is a diagrammatic view of an air conditioning (A/C) system for a vehicle controlled by a method, according to the present invention.
Figure 2:
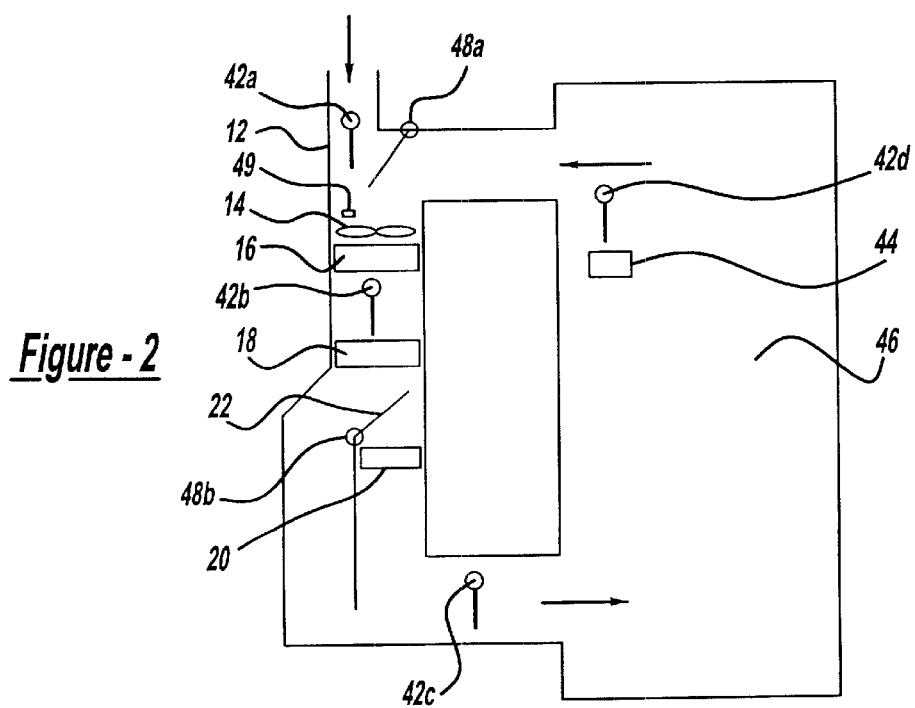
FIG. 2 is a diagrammatic view of sensors of the A/C system of FIG. 1 controlled by the method, according to the present invention.

Referring to the drawings and in particular FIGS. 1 and 2, one embodiment of an air conditioning (A/C) system 10 is shown for a vehicle (not shown) such as a motor vehicle. In general, control of air temperature and air flow (and, to a lesser extent, humidity) within the vehicle is accomplished using various actuators to effect the temperature and flow of air supplied to an interior, cabin, or occupant compartment 46 of the vehicle. The A/C system 10 includes an air handling case or housing 12 and a variable speed blower motor or fan 14 for moving air through the housing 12. The A/C system 10 also includes an evaporator 16 disposed in the housing 12 and spaced from the fan 14 to receive moving air therethrough from the fan 14 and to cool the air. The A/C system 10 also includes a desiccant dryer 18 spaced after or downstream from the evaporator 16 to receive moving air therethrough from the evaporator 16. The desiccant dryer 18 removes moisture or water vapor from the air. The A/C system 10 includes a heater core 20 disposed in the housing 12 and spaced after or downstream from the desiccant dryer 18 to heat the air and a door 22 to allow or prevent moving air from the desiccant dryer 18 from passing through the heater core 20. It should also be appreciated that the desiccant dryer 18 is located after the evaporator 16 because it is the position of highest relative humidity in the A/C system 10 and the absorption rate of water vapor by standard desiccant materials (e.g., silica gels) is a stronger function of relative humidity than any other parameter (temperature or ambient pressure).

The A/C system 10 also includes an expansion valve 22 fluidly connected to the evaporator 16 and a receiver dryer 24 fluidly connected to the expansion valve 22. The A/C system 10 includes a condenser 26 fluidly connected to the receiver dryer 24 and a compressor 28 fluidly interconnecting the condenser 26 and the evaporator 16. The compressor 28 is preferably a 160 cc variable displacement swashplate compressor. The A/C system 10 includes an electronically controlled valve 30 connected to the compressor 28 to alter the capacity of the compressor 28 by varying the pressure in the crankcase of the compressor 28. The electronically controlled valve 30 is preferably a pulse width modified (PWM) 0.7 Amp solenoid device that allows discharge pressure to bleed into the crankcase of the compressor 28. It should be appreciated that by varying the PWM signal properties increased bleed will cause the crankcase pressure to increase.

It should also be appreciated that changing the crankcase pressure adjusts the angle of the swashplate, thus reducing the displacement of the compressor 28. It should further be appreciated that refrigerant flows through the condenser 26, compressor 28, evaporator 16, expansion valve 22, and receiver dryer 24.

The A/C system 10 includes an electronic control unit 32 electrically connected to the electronically controlled valve 30. The electronic control unit 32 includes a microprocessor (not shown) having an analog input section (not shown), digital input section (not shown), digital output section (not shown), and pulse width module (PWM) section (not shown). The electronic control unit 32 is electrically connected to an ignition switch (not shown), which is in turn, electrically connected to a power source (not shown) such as a battery of the vehicle. The electronic control unit 32 receives several inputs such as control setting input 34, temperature input 36, relative humidity (rh) input 38, and sun load input 40. It should be appreciated that the electronic control unit 32 preferably continually monitors the state of the ignition switch and the state of the A/C system 10. It should also be appreciated that the A/C system 10 further includes an arrangement of air flow doors that may be driven by vacuum motors (not shown) between their various vacuum, partial vacuum and no vacuum positions or by an electric servomotor (not shown) in a conventional manner. It should further be appreciated that each of the above components is in communication with the housing 12 and associated ducting (not shown) in order to control temperature, the direction of air flow and the ratio of fresh or intake air to recirculated air.

Referring to FIG. 2, the A/C system 10 includes a plurality of sensors for monitoring the A/C system 10 and providing signals to the electronic control unit 32. The sensors include a plurality of temperature sensors to provide the temperature input 36 and sun load input 40. The temperature sensors include an ambient temperature sensor 42a, an evaporator temperature sensor 42b, an outlet temperature sensor 42c, and an occupant or cabin temperature sensor 42d, which are representative of ambient (outside) air temperature, evaporator outlet temperature, discharge air temperature, and interior (cabin) temperature. The sensors also include a relative humidity sensor 44 to provide the rh input 38. The relative humidity sensor 44 is located in the occupant compartment or cabin 46 of the vehicle. The sensors include a plurality of door position sensors to provide input to the electronic control unit 32. The door position sensors include a rear door position sensor 48a and a blend door position sensor 48b. The sensors also include a blower flow rate sensor 49 to provide input to the electronic control unit 32. The sensors are electrically connected to the analog section of the electronic control unit 32. It should be appreciated that the sensors provide an analog input to the electronic control unit 32.

The A/C system 10 includes a plurality of buttons (not shown) set manually by the operator of the vehicle to provide the control setting input 34 which is representative of power (off), desired temperature (temp), air conditioning (a/c), automatic control (auto), fan, defrost (def), mode, and recirculation (recirc). The buttons are located in the occupant compartment 46 of the vehicle and are electrically connected to the digital input section of the electronic control unit 32. It should be appreciated that the buttons provide a digital input to the electronic control unit 32.

The A/C system 10 also includes a display (not shown) to display information from the electronic control unit 32 such as temperature, mechanisms on or actuated, etc. The display is electrically connected to the digital output section of the electronic control unit 32. The display may include a plurality of lights (not shown) such as light emitting diodes (LEDs) to indicate which buttons are on.

The A/C system 10 also includes a plurality of mechanisms (not shown) such as actuators, motors, clutches and solenoids to control various components of the A/C system 10 such as air flow doors, blower, a/c clutch, etc. The mechanisms are electrically connected to the electronic control unit 32. It should be appreciated that the electronic control unit 32 controls the doors and the blower or fan 14 to regulate the temperature and flow of air into the cabin or occupant compartment 46 of the vehicle. It should be appreciated that, for automatic control of the temperature and flow of air in the occupant compartment 46 of the vehicle, the A/C system 10 monitors conditions within and outside the occupant compartment 46 and generates signals to control the plant actuators according to the conditions as indicated by the sensors.

Referring to FIG. 3, the desiccant dryer 18 may be of a carousel type having a carousel 50 with a plurality of, preferably two, active chambers 52 and a regeneration chamber 54. The desiccant dryer 18 includes a rotary motor (not shown) to move the carousel 50 around to the regeneration position. The desiccant dryer 18 is located in the housing 12 of the A/C system 10 and connected to a source of vacuum for the regeneration chamber 54. It should be appreciated that the motor is controlled by the electronic control unit 32. It should also be appreciated that the desiccant dryer 18 is compact and lightweight. It should further be appreciated that the desiccant dryer 18 is able to cycle rapidly and hold a partial vacuum.

Referring to FIG. 4, another embodiment of the desiccant dryer 18 is shown. Like parts of the desiccant dryer 18 have like reference numerals increased by one hundred (100). In this embodiment, the desiccant dryer 118 may be of a plate type having a plurality of plates 156 forming a plurality of, preferably four, active chambers 158 and two regeneration chambers 160. The airflow is closer to the regeneration chambers 160. The desiccant dryer 118 includes a linear motor (not shown) to move plates 162 to have heat transfer from the active chambers 158 to the regeneration chambers 160. The desiccant dryer 118 is located in the housing 12 of the A/C system 10 and connected to a source of vacuum for the regeneration chambers 160. It should be appreciated that the motor is controlled by the electronic control unit 32. It should also be appreciated that the desiccant dryer 118 is compact and lightweight. It should further be appreciated that the desiccant dryer 118 is able to cycle rapidly and hold a partial vacuum.

Referring to FIG. 5, yet another embodiment of the desiccant dryer 18 is shown. Like parts of the desiccant dryer 18 have like reference numerals increased by two hundred (200). In this embodiment, the desiccant dryer 218 may be of a plate and tube type having a plurality of tubes 264 forming a plurality of, preferably four, active chambers and a plurality of tubes 266 forming a plurality of, preferably four, regeneration chambers. The desiccant dryer 218 is located in a cavity (not shown) in the ceiling or roof (not shown) of the vehicle or under the seats (not shown) of a driver and passenger occupant (not shown). The desiccant dryer 218 may include a perforated ceiling 268 if mounted in the roof of the occupant compartment 46. It should be appreciated that, although efficiency is lost due to the lower relative humidity in the vehicle, the cabin or occupant compartment 46 has more room to accommodate the desiccant dryer 218. It should also be appreciated that the tubes 266 are connected to a source of vacuum. It should further be appreciated that the desiccant dryer 218 is able to cycle rapidly and hold a partial vacuum.

Figure 6:
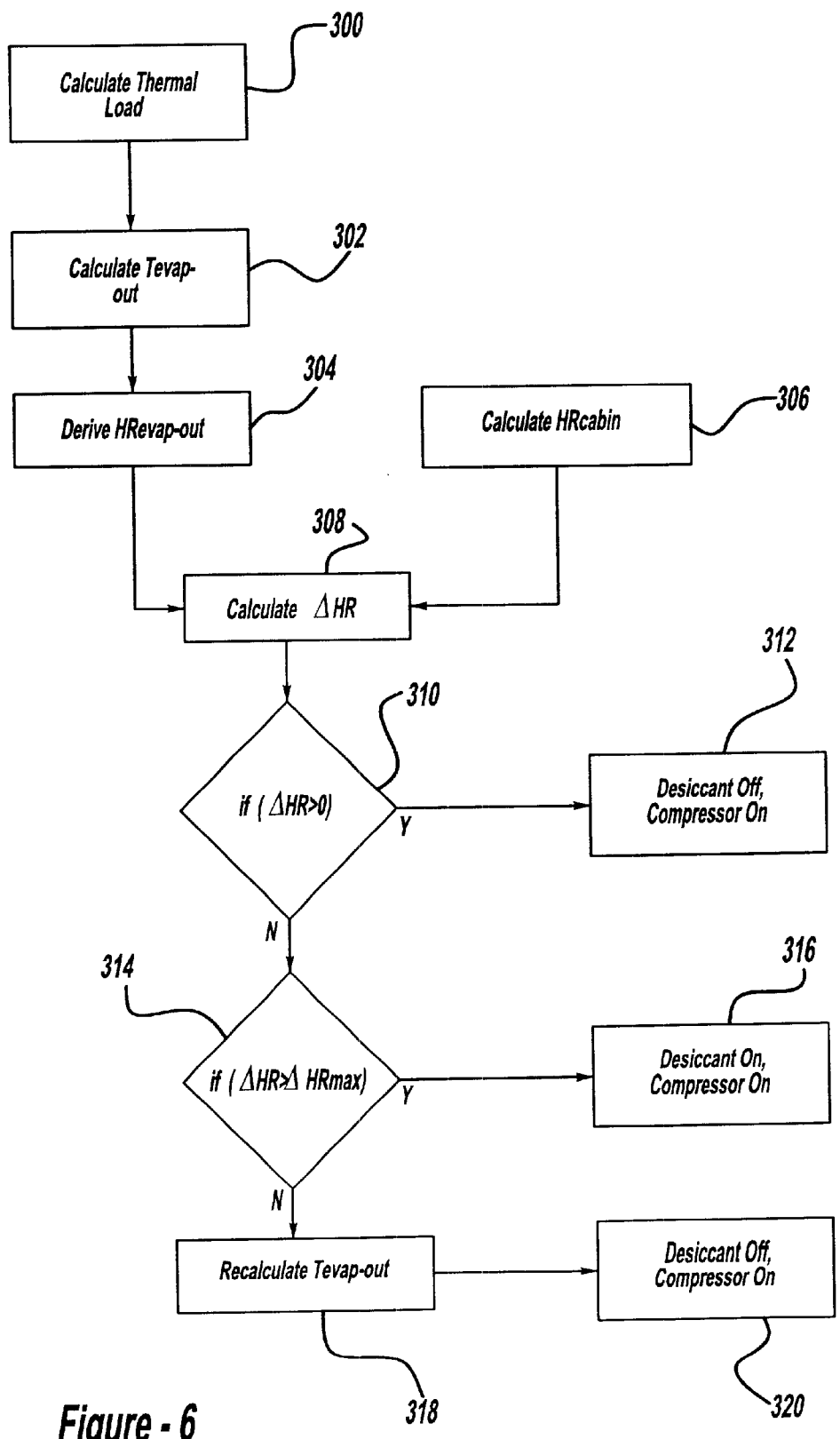
FIG. 6 is a flowchart of a method, according to the present invention, of controlling the A/C system of FIG. 1.

Referring to FIG. 6, a method, according to the present invention, of controlling the A/C system 10 is shown. The method starts or begins in block 300. The temperature sensors, in car humidity sensor, the blend/fresh air door position sensors, blower motor speed sensor, and sun load sensors are used by the method to calculate the total thermal or heat load in block 300. The thermal load can be approximated by direct calculation, but it is more common to calculate a pseudo-load number, termed the Valavg, as follows:

$$Valavg=Offset-K1*Sun+K2*T_{set}+K3*T_{amb}+K4*T_{cabin}$$

The method advances to block 302 and the total heat load on the A/C system 10 is used by the method to calculate a target evaporator outlet temperature ($T_{evap}$) in block 302. This can be done, again by direct calculation from the thermal load, or more commonly by a look-up table based on the Valavg as follows:

| Valavg | Tevap |
|---|---|
| 50 | 35 |
| 100 | 80 |
| 130 | 85 |
| 195 | 160 |

Figure 7:
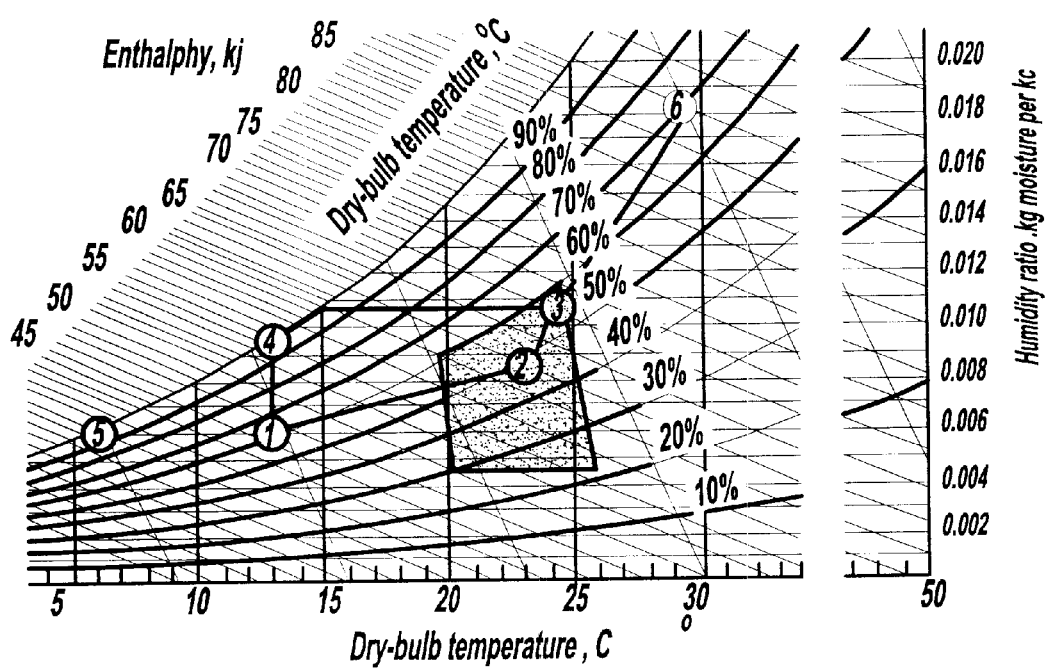
FIG. 7 is a psychometric chart used in conjunction with the method and A/C system of FIG. 1.

In block 304, the target evaporator outlet temperature is used to calculate $HR_{evap}$. Using the dew point from a psychometric chart as illustrated in FIG. 7, it is possible to deduce the corresponding humidity ratio:

$$HR_{TeVap}=fpsych\text{-}chart(T_{evap})$$

In block 306, the method calculates the humidity ratio ($HR_{cabin}$) in the cabin or occupant compartment 46. The humidity ratio ($HR_{cabin}$) in the occupant compartment 46 can also be determined from psychometric calculations or appropriate approximations:

$$HR_{cabin}=fpsych\text{-}chart(T_{cabin}, Rh_{cabin})$$

If the humidity ratio calculated for the occupant compartment 46, as illustrated in FIG. 7, is greater than 0.009 $kg_{water}/kg_{air}$, there is a need to reduce the humidity in the occupant compartment 46. This is achieved by conditioning the air into the occupant compartment 46. A simplified method is as follows (an offset humidity ratio of 0.008 is used to ensure convergence around 0.009):

$$HR_{desired}=0.008-(HR_{actual}-0.009)$$

Comparing the two humidity ratios, it is possible to determine whether or not the desiccant dryer 18,118,218 is required. If $HR_{Tevap}$ is greater that $HR_{desired}$, then the desiccant dryer 18,118,218 needs to be activated. If the difference is greater than the desiccant dryer 18,118,218 is capable of, then the evaporator exit temperature ($T_{evap}$) needs to be reduced.

In block 308, the method calculates the difference in humidity ratio (ΔHR) between blocks 304 and 306 as follows:

$$\Delta HR=HR_{desired}-HR_{evap}$$

The method then advances to block 310 and determines whether ΔHR is greater than a predetermined value such as zero. If so, the method then advances to block 312 and turns the desiccant dryer 18,118,218 Off and the compressor 28 On.

If not, the method advances to diamond 314 and determines whether ΔHR is less than a maximum predetermined value ($\Delta HR_{max}$). $\Delta HR_{max}$ is a value determined from the capacity of the desiccant dryer 18,118,218 as follows:

$$\Delta HR_{max}=(dm_{H2O}/dt)/(dm_{air}/dt)$$

Where: $dm_{H2O}/dt$=Humidity removal capacity of the desiccant dryer/hr; and $dm_{air}/dt$=Air flow rate.

If so, the method then advances to block 316 and turns the desiccant dryer 18,118,218 On and the compressor 28 On.

If not, the method advances to block 118 and recalculates the evaporator outlet temperature ($T_{evap}$). The new evaporator outlet temperature is determined by the dewpoint of the sum of $HR_{desired}$ and $\Delta HR_{max}$ as follows:

$$T_{evapmodified}=f^{-1}_{psych\text{-}chart}(HR_{desired}+\Delta HR_{max})$$

The method then advances to block 320 and turns the desiccant dryer 18, 118, 218 On and the compressor 28 On. It should be appreciated that the electronic control unit 32 turns the compressor On and Off via an electromagnetic clutch, which controls the outlet evaporator temperature via the valve 30. It should also be appreciated that by turning the desiccant dryer 18, 118, 218 On, the regeneration chambers are connected to vacuum to boil off the water vapor from the desiccant materials therein. It should further be appreciated that, as illustrated in FIG. 7, using a standard A/C loop, the A/C system 10 with the compressor 28 can cool the air to point #4 and then using the desiccant dryer 18, 118, 218 to isothermally dehumidify the air to point #1.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present-invention may be practiced other than as specifically described.

What is claimed is:

1. An air conditioning (A/C) system for a vehicle comprising:

an evaporator;

a desiccant dryer located downstream of said evaporator;

a compressor fluidly connected to said evaporator;

a plurality of sensors to provide inputs relating to temperature of said evaporator and relative humidity of an occupant compartment of the vehicle; and an electronic control unit electrically connected to said sensors to receive the inputs therefrom and electrically connected to said desiccant dryer and said compressor to turn said desiccant dryer and said compressor On and Off to control the temperature and relative humidity of air to the occupant compartment.

2. An A/C system as set forth in claim 1 wherein said compressor is a variable displacement compressor.

3. An A/C system as set forth in claim 1 wherein said sensors include a sunload sensor disposed in the occupant compartment.

4. An A/C system as set forth in claim 1 wherein By said sensors include a blend door position sensor.

5. An A/C system as set forth in claim 1 wherein said sensors include an ambient temperature sensor.

6. An A/C system as set forth in claim 1 wherein said sensors include an interior temperature sensor disposed in the occupant compartment.

7. An A/C system as set forth in claim 1 wherein said sensors include a relative humidity sensor disposed in the occupant compartment.

8. An A/C system as set forth in claim 1 wherein said sensors include an evaporator temperature outlet sensor.

9. An A/C system as set forth in claim 1 wherein said sensors include a blower fan sensor.

10. An A/C system as set forth in claim 1 including a pulse width modification valve connected to the compressor and electrically connected to said electronic control unit.

11. A method of controlling an air conditioning (A/C) system for a vehicle comprising:

providing an evaporator, a desiccant dryer located downstream of the evaporator, and a compressor fluidly connected to the evaporator;

receiving a plurality of sensed inputs from sensors relating to temperature of the evaporator and relative humidity of an occupant compartment of the vehicle; and controlling the temperature and relative humidity of air to the occupant compartment based on the received inputs by turning the desiccant dryer and the compressor On and Off.

12. A method as set forth in claim 11 including the step of calculating a thermal load on the vehicle prior to said step of controlling.

13. A method as set forth in claim 12 including the step of calculating an evaporator temperature outlet of the evaporator and deriving a humidity ratio out of the evaporator.

14. A method as set forth in claim 13 including the step of calculating the humidity ratio of the occupant compartment of the vehicle.

15. A method as set forth in claim 14 including the step of calculating a difference in the humidity ratio between the evaporator and the occupant compartment.

16. A method as set forth in claim 15 including the step of determining whether the difference in the humidity ratio is greater than zero.

17. A method as set forth in claim 16 including the step of turning the desiccant dryer Off and the compressor On if the difference in the humidity ratio is greater than zero.

18. A method as set forth in claim 16 including the step of determining whether the difference in the humidity ratio is less than a humidity ratio maximum value.

19. A method as set forth in claim 18 including the step of turning the desiccant dryer On and the compressor On if the difference in the humidity ratio is less than the humidity ratio maximum value.

20. A method as set forth in claim 19 including the step of recalculating the evaporator outlet temperature of the evaporator.

* * * * *